Oct. 30, 1923.
L. G. COPEMAN
1,472,266
REFRIGERATING APPARATUS
Filed Jan. 28, 1921
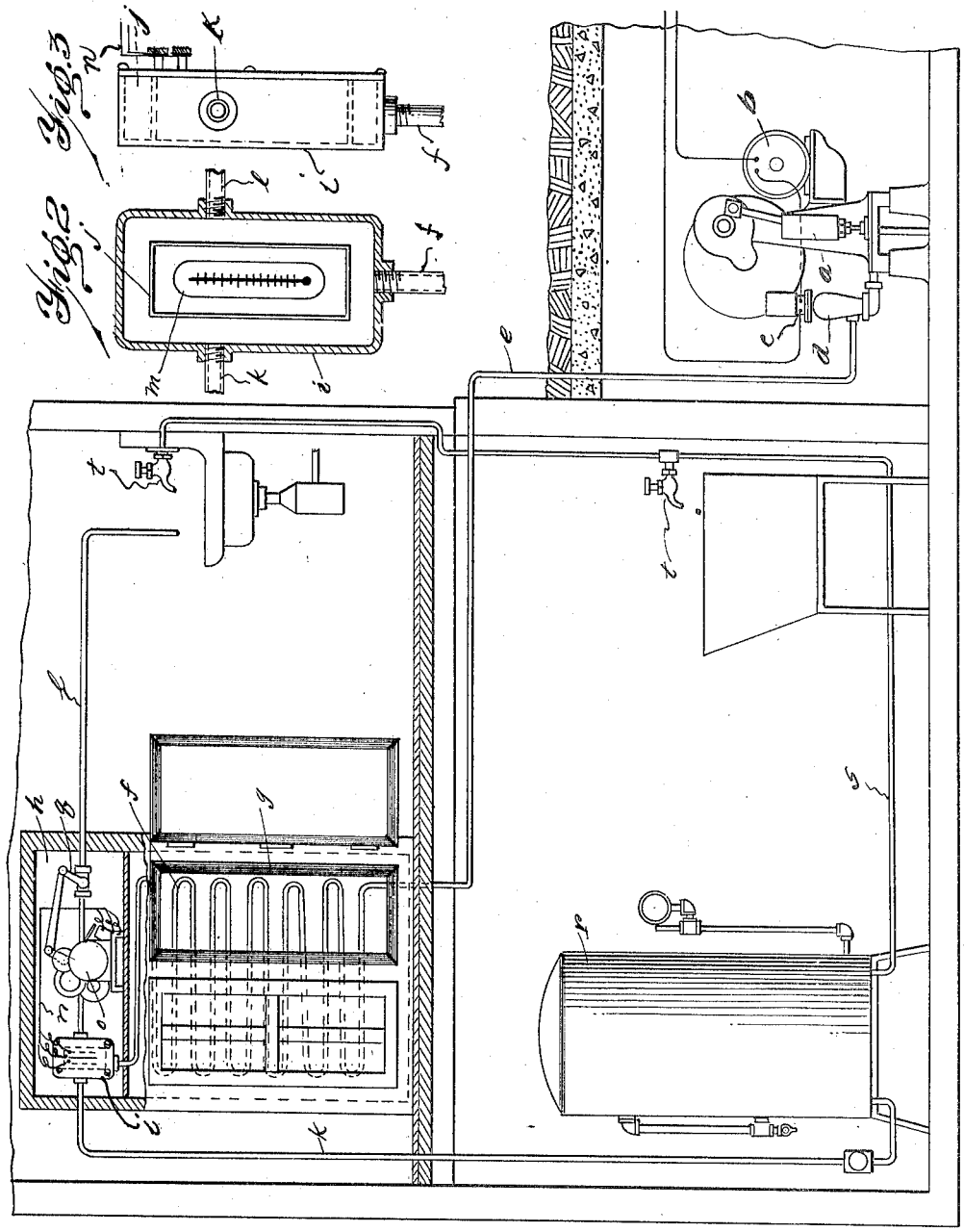
INVENTOR.
LLOYD G. COPEMAN
BY
Stuart C. Barnes
ATTORNEY.

Patented Oct. 30, 1923.

1,472,266

UNITED STATES PATENT OFFICE.

LLOYD G. COPEMAN, OF FLINT, MICHIGAN, ASSIGNOR TO EDWIN W. ATWOOD, OF FLINT, MICHIGAN.

REFRIGERATING APPARATUS.

Application filed January 28, 1921. Serial No. 440,637.

*To all whom it may concern:*

Be it known that I, LLOYD G. COPEMAN, a citizen of the United States, residing at Flint, in the county of Genesee and State of Michigan, have invented certain new and useful Improvements in Refrigerating Apparatus, of which the following is a specification.

This invention relates to refrigerating apparatus and has for its object refrigerating apparatus in which the cooling medium is liquid circulated through the refrigerating box. This circulation is automatically controlled by a thermostat.

In my Patent No. 1,409,283, of March 14, 1922 I have described a thermostat which is exposed to the air of the food chamber and hence is operated by the changes of temperature in the box itself. This thermostat is arranged to open or close a valve in the water supply line at predetermined temperatures in the box. The water circulating through the box is largely wasted.

It is the object of the present invention to provide an improvement in this refrigerating system so that water drawn through the taps for service use will serve to cool the refrigerator. Furthermore, the present improvement is designed primarily for use in connection with a water storage tank. A water storage tank is a part of most of the water supply systems with an automatically-controlled pump now used in rural communities. The present refrigerating apparatus is so designed and arranged that the wastage of water through the refrigerator in no way interferes with the filling up of the storage tank when this is depleted.

A further feature of this design of apparatus is that the thermostat is put directly in the water line and it is the temperature of the water rather than the food chamber that operates the thermostat. This results in an immense saving in water, as will be presently described in detail. Furthermore, it permits the temperature of the food chamber to be kept within a less range of fluctuation than is the case where the thermostat is exposed only to the temperature of the air in the food chamber.

In the drawings,—

Fig. 1 is a side elevation of the apparatus partly in section and in its nature diagrammatic.

Fig. 2 is a vertical cross section through the thermostat.

Fig. 3 is a side elevation of the thermostat.

$a$ designates a water pump driven by the electric motor $b$ which is in turn controlled by a switch $c$ that is automatically operated by the pressure-controlled devices $d$. This apparatus is common construction now to be had on the market and which is quite generally used in rural communities. We have, therefore, not thought it necessary to detail this. However, in my Patent No. 1,409,283 of March 14, 1922, these devices are described in detail and illustrated. The water is pumped preferably from a well (not shown), through the water main $e$, through the coils $f$ in the box $g$, then up into the top of the refrigerating box into a device-containing chamber $h$, where the various operating devices are located.

In this chamber $h$ is located a housing $i$ for the thermostat. This housing $i$ is simply a casting provided with a suitable water chamber or jacket $j$ through which the water from the coils may circulate.

The service main $k$ leads out one side of the water jacket and the waste pipe $l$ leads out the opposite side of the water jacket. The thermostat $m$ is located in the center chamber, which may be water-sealed against the water jacket by suitable packing (not shown). The thermostat being enclosed on four sides by the water, obviously it is influenced largely by the temperature of the surrounding water.

This thermostat, by suitable electrical connections $n$, controls a motor $o$ that opens and closes the valve $q$ in the waste line $l$. Thermostatic apparatus for opening and closing the valve in a fluid line either by means of an electric motor or otherwise is old, and inasmuch as this specific part of the construction is not a part of my invention, I have not thought it necessary to detail the same. Let it be enough to refer to my Patent No. 1,409.283, March 14, 1922, where I have detailed with considerable specificness one form of electric motor control that is suitable for opening and closing the water line valve through the action of a thermostat.

A service main $k$ leads from the thermostat water jacket down into the storage tank $r$, thence through the service line $s$ to the various taps, such as $t$, $t$.

The operation perhaps can be best described by contrast with what would be the occurrence in case the design is not such as it is. Supposing the thermostat was controlled by the temperature in the food chamber itself, as in my said previous patent, and suppose the chamber becomes warm and the thermostat that operates the valve $q$ would start discharge of waste to induce circulation; and further consider that in the meantime the contents of the storage tank $r$ have been depleted by use of water through the taps—in such a series of events it will be apparent that it will take an unusually long time to re-fill the storage tank $r$ for a large part of the water pumped will continue to be wasted through the pipe $l$ because the thermostat controlled by the temperature of the air of the food chamber will keep that valve open until the temperature in the food chamber is dropped to the desired point. The result would be that the storage tank will only get half or less of the water being pumped, obviously requiring considerable time to re-fill it, and in case the service pipes are being used, not re-filling it at all until these are turned off. Furthermore, only half the water is available for the service lines. The other part is being wasted.

Having in mind this condition, the value of this improved design will be apparent. By having a thermostat set directly in the water line so as to be controlled by the temperature of the water, the following condition and operation will happen under the same hypothetical conditions. The temperature of the food chamber being high, obviously the water in the coils will absorb some of the heat and become warmer. At a predetermined point the heat of the water in the coils will excite the thermostat, which in turn will open the valve $q$. As soon as a few quarts of water have been drawn through the refrigerator to displace the warm water in the coils with cold water, the cold water will re-act on the thermostat to close the valve $q$. Hence now when any water is drawn either through the service taps $t$ or to re-fill the storage tank $r$, it is not a weak stream due to the discharge through the waste opening. Obviously as long as the water is being drawn through the service taps or into the storage tank to replenish the storage tank there is no chance for the waste to open, for the water jacket of the thermostat will be kept sufficiently cold to keep the waste closed.

It will, therefore, be apparent that here is a design where water distribution practically insures an elimination of waste while the service or storage tank is drawing on the pump, thus insuring the saving of water. It has, however, the further advantage of avoiding diminution of supply for the storage tank and the taps when the refrigerator needs circulation of water to lower its temperature.

Furthermore, this arrangement is useful to eliminate waste even supposing that the service taps and the storage tank are wholly eliminated from consideration or are not in action. Instead of circulating water rapidly through the coils in accordance with the maximum capacity of the pump until the temperature in the food chamber falls to the desired point, the action is a slower one, resulting in great water economy. As soon as the food chamber heats up considerable of this heat is absorbed by the water in the coils, and when this water heats up to a predetermined degree the action started by the thermostat replaces it with a new coil full of cold water, wasting only the water that is useless as a refrigerating medium because of it having absorbed the heat of the food chamber. As soon as the coils full of water have again absorbed a small amount of heat the same is discharged through the waste and again replenished.

The thermostat may be a sensitive one and the same be set so that a variation of one degree in temperature in the water serves to open or close the valve. Consequently when a small amount of heat has been absorbed, sufficient to raise the temperature of the water one degree, a new supply of cold water is brought into the coils, and so the operation repeated as often as the temperature of the water rises slightly. Obviously this is a very much more economical way of absorbing heat than to have a constant flow of water through the coils, a large amount of which is discharged without having absorbed its maximum capacity of heat units because it goes through the coils so fast.

The arrangement of the refrigerator and the service line so that all the service water passes through the refrigerator is a most useful and effective one. The thermostat cannot be set to cut off the circulation at the average temperature of the water for the reason that the thermostat may get out of adjustment, or for other reasons it may not work accurately. Consequently if it were set at this limit it might be that the water would continuously run. It is, therefore, necessary to set the thermostat several degrees higher than the temperature of the water. For instance, suppose the average temperature of the water is 47 degrees. It is not possible to adjust the thermostat to shut the water off when this minimum is reached in the food chamber. It will be necessary to shut the thermometer, say, to close the circulation at 50 degrees. However, with the service water running through the refrigerator obviously this service water will further abstract heat and tend to keep the box much lower than the point at which the thermostat is regulated to shut off the circulation.

This has, therefore, a very material advantage.

Of course, this apparatus is intended primarily for keeping the temperature of the box down to a given temperature, but obviously by simply reversing the terminals on the thermostat in the way specifically described in my prior application No. 438,593, the same apparatus could be used to keep up the temperature in the refrigerator which was exposed to low winter temperature. Hence in the claims and specification, no matter what the language is, I desire it understood that this reversal of use comes within the true scope of the invention.

What I claim is:

1. In a refrigerating apparatus, the combination of a refrigerating box, a water line passing through the box for refrigerating the same and continuing to form a service line, a waste line leading away from the water line after the same has passed through the refrigerator, and a thermostat and valve for controlling the waste line.

2. In a refrigerating apparatus, the combination of a refrigerating box, a water line passing through the box for refrigerating the same and continuing to form a service line provided with taps, a waste line leading away from the water line after the same has passed through the box, a valve in the waste line, and a thermostat chiefly controlled by the water in the water line for opening and closing through suitable connections the said valve in the waste line.

3. In a refrigerating apparatus, the combination of a refrigerating box, a water line passing through the box for refrigerating the same and continuing to form a service line provided with a storage tank and continuing from the storage tank to a point where it is provided with taps, a waste line leading away from the water line after the same has passed through the refrigerator, a thermostat surrounded by the water in the water line immediately after it has passed through the refrigerating box, and a valve operated by the thermostat and located in the waste line for controlling the waste line.

4. In a refrigerating apparatus, the combination of a refrigerating box, and a water line including service taps, said water line passing first through the refrigerator and then to the service taps and arranged to abstract heat from the refrigerator to cool the same, and means for wasting water passing through the refrigerator provided with a control operated by the temperature of the water line in the box.

5. In a refrigerating apparatus, the combination of a refrigerating box, a water line provided with a plurality of coils located in said box and having service taps, the said water line passing first through the coils of the box and thence to the service taps, and means for automatically causing circulation of water through the coils when a given temperature is reached in the refrigerator.

6. In a refrigerating apparatus, the combination of a refrigerating box, a water line provided with a plurality of coils located in said refrigerating box and provided with service taps, said water line passing first through the coils and then to the service taps, and thermostatic means for wasting water to cause water to pass through the coils when a given temperature is reached in the box.

7. In a refrigerating apparatus, the combination of a refrigerating structure provided with a chamber, a water line leading therethrough for keeping the chamber cool by abstracting heat therefrom, a waste line leading from the water line after the same has passed through the refrigerating chamber, a valve controlling said waste line, means for completely opening and closing said valve by a quick action, and a thermostat controlled by the temperature of the water in that part of the line in the structure for initiating action by said last-mentioned means to completely open the valve when the water in the box reaches a given temperature and to close the valve and hold the water when colder water has replaced the warmer water.

In testimony whereof I affix my signature.

LLOYD G. COPEMAN.